INVENTOR
George H. Dyer
BY Strong & Townsend
ATTORNEYS

UNITED STATES PATENT OFFICE.

GEORGE H. DYER, OF SAN FRANCISCO, CALIFORNIA.

TRACTOR AND LIKE DRAWBAR.

1,405,906. Specification of Letters Patent. Patented Feb. 7, 1922.

Application filed November 26, 1919. Serial No. 340,731.

*To all whom it may concern:*

Be it known that I, GEORGE H. DYER, a citizen of the United States, residing at 17th and Kansas Sts., city of San Francisco, in the county of San Francisco and State of California, have invented new and useful Improvements in Tractors and Like Drawbars, of which the following is a specification.

This invention relates to a draw bar connection for tractor engines and the like, in which plows or other apparatus are detachably connected with the traction engine.

It consists in a means for so connecting a draw bar with the traction engine that the tractive effort will be more evenly distributed through the motor, or the direction of the pull may be reversed so as to be applied from the front. It also consists in so connecting the draw bar and disposing it with relation to the driving wheel axle and the fulcrum of effort, so as to throw the greater portion of the pulling strain on the front axle during forward pull of the tractor and thus lessen the tendency for the tractor to tip backwards. It further consists in details of construction which will be more fully explained by reference to the accompanying drawings, in which:—

Figure 1:
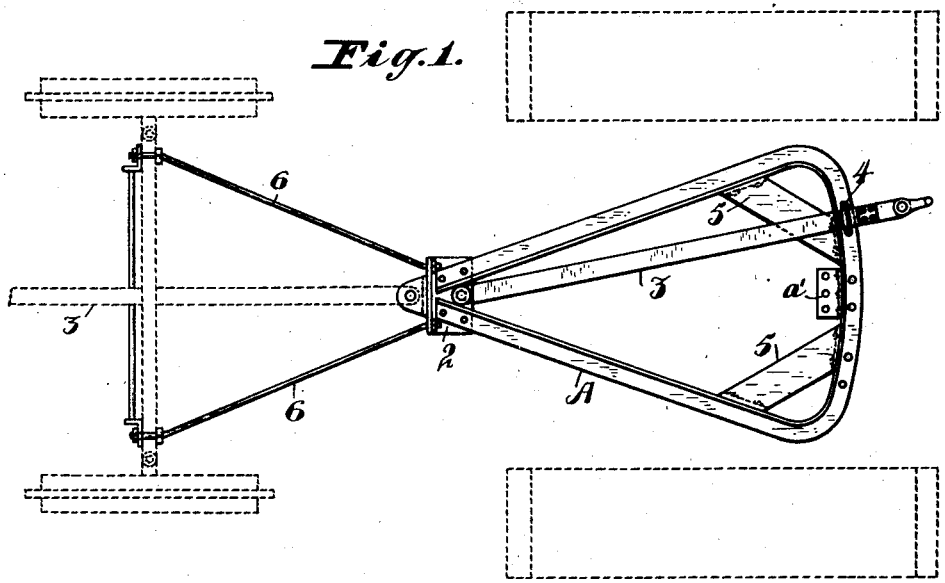
Fig. 1 is a plan view of the attachment.
Figure 2:
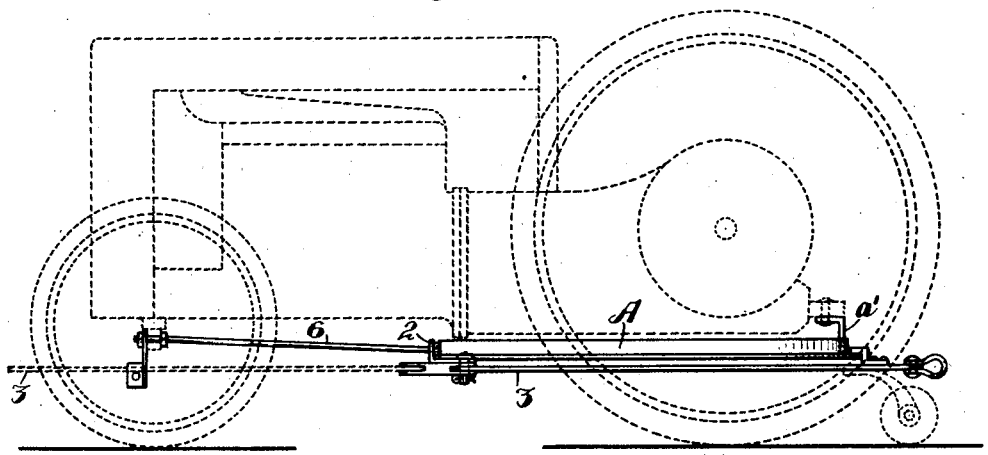
Fig. 2 is a side elevation.

This invention is shown as applied to what is known as the Fordson tractor, and illustrates its use in connection with this or any other tractor, in such a manner as to provide the best distribution of the stresses produced, in the hauling of loads.

As shown in the drawings, A is a coupler frame, triangular in shape, convergent with the sides meeting in front and with the rear member curved about a radius having its center at these meeting ends. This frame is attached to the supporting beam at a', with a draft plate 2 contiguous to the front junction, and a draft bar 3 is strongly pivoted to said plate, and extends rearwardly across the rear member of the frame which has holes punched, and guide pins 4 between which the draft bar may be held in line with load to which its rear end is attached. The steps 5 attached diagonally across the rear of the frame, serve to increase its rigidity and prevent its being bent by heavy side strains.

From the draft plate 2 rods 6 extend forward and have their front ends adjustably attached to the front axle, so that draft stresses are partly transferred to and borne by this axle. This construction also allows the draft bar to be positioned so as to extend forwardly and, be connected with a load which will be pulled by the tractor moving in reverse direction. The draft bar 3 extends some distance to the rear of the frame A and the whole of the draft apparatus is located below the driving axle, which is driven by a worm gear (not shown). If by reason of too heavy a load, or if the wheels sink in the mud the heavy pull will cause the worm to produce such a heavy leverage through the gear and axle that the tractor will tend to tip up in front, or even turn over back. This extension of the draft bar will thus be disposed to strike the ground and prevent upset. The connections of the draft bar and frame are all below the driving axle level and have no connections which injure the engine, or the transmission case, the pulling strain being from the front axle through the draw bar to the load. The rear end of the draft bar may have a shoe or small bearing rollers attached to it, to bear upon the ground and resist the tendency of the tractor to upset under heavy pull.

Having thus described my invention, what I claim and desire to secure by Letters Patent is:

1. A draft mechanism for tractors and the like including a triangular coupler frame, a draft plate attached to the apex of said frame, said draft plate being located approximately equidistant from the front and rear wheel axles, divergent rods connecting the draft plate with the front axle and supports for the rear end of the coupling frame dependent from the rear tractor frame, and a draft bar pivoted to the draft plate with its rear end extending beyond and movable transversely upon the coupler, and means by which the transverse movement of the draft bar on the coupler may be limited.

2. The combination with a tractor having a main frame and bearing wheels of a triangular coupler frame having its rear end curved on an arc about its apex and support from the rear frame bar of the tractor by which said rear end of the coupler frame is carried, a coupling plate secured to the apex of the coupler frame, and rods divergent from said plate connected with the front axle and the draft bar pivoted to the plate extending beneath the rear of the coupler, and guide pins in the coupler between which the draft bar extends and is transversely adjusted.

3. The combination with a tractor and the main frame thereof of a draft mechanism comprising a draft plate located beneath the main frame and independent thereof, rods diverging forwardly from the draft plate and connected with the front axle, a triangular coupler frame with its apex secured to the draft plate and having an arch-shaped rear portion or base, means depending from the rear portion of the main frame upon which the rear of the coupler is borne, a draft bar pivoted to the draft plate extending rearwardly across the rear portion of the coupler frame, and guide means on the rear portion of the coupler frame between which the rear of the draft bar may be shifted and the line of draft changed.

4. A draft mechanism for tractors comprising a coupler frame disposed beneath the rear end of the tractor, means for securing said frame below the rear axle of the tractor, a coupling plate on the forward end of the coupler frame, a draw bar pivotally connected at its one end to said coupling plate and radius rods between said coupling plate and front axle, said rods being so connected to the coupling plate that the major portion of the draft will be exerted thereon.

5. A draft mechanism for tractors comprising a coupler frame disposed beneath the rear end of the tractor, means for securing said frame below the rear driving axle of the tractor, a coupling plate secured to the forward end of the frame, a draw bar connecting plate pivotally secured to the coupling plate adapted for connection with the draw bar for either a forward or backward pull of the tractor, and radius rods between the front axle and coupling plate, said rods being connected so that they will take up the major portion of the pull of the draw bar when the tractor moves in one direction and to permit the coupler frame to sustain the pull of the draw bar when the tractor moves in the opposite direction.

In testimony whereof I have hereunto set my hand in the presence of two subscribing witnesses.

GEORGE H. DYER.

Witnesses:
W. W. HEALEY,
M. E. EWING.